US008254386B2

(12) United States Patent
Yadav (10) Patent No.: US 8,254,386 B2
(45) Date of Patent: Aug. 28, 2012

(54) INTERNET PROTOCOL MULTICAST ON PASSIVE OPTICAL NETWORKS (75) Inventor: Rajesh Yadav, Ashland, MA (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 238 days.

(21) Appl. No.: 12/732,448

(22) Filed: Mar. 26, 2010

(65) Prior Publication Data

US 2011/0235635 A1 Sep. 29, 2011

(51) Int. Cl.
*H04L 12/28* (2006.01)
(52) U.S. Cl. .......... 370/390; 370/400
(58) Field of Classification Search .......... 370/390, 370/400
See application file for complete search history.

(56) References Cited

U.S. PATENT DOCUMENTS

| 5,689,505 | A * | 11/1997 | Chiussi et al. | 370/388 |
| 2006/0013247 | A1* | 1/2006 | Koch et al. | 370/437 |
| 2008/0144622 | A1* | 6/2008 | Platnic | 370/390 |
| 2008/0267626 | A1* | 10/2008 | Niu | 398/66 |
| 2011/0128957 | A1* | 6/2011 | Singh et al. | 370/390 |

* cited by examiner

Primary Examiner — Jung Park (57) ABSTRACT

A method for implementing multicast via a passive optical network (PON) may include receiving Internet group multicast protocol (IGMP) messages from a customer device. Multicast information associated with the IGMP messages is identified, wherein the multicast information includes at least multicast group information and customer identification information. The multicast information is stored in a multicast state table. Downstream layer 2 traffic is received and multicast addressing information is extracted from the layer 2 traffic. It is then determined whether the multicast addressing information matches the multicast group information stored in the multicast state table. The layer 2 traffic is forwarded on at least one PON interface corresponding to the customer identification information that is associated with the stored multicast group information when the multicast addressing information matches the multicast group information stored in the multicast state table.

19 Claims, 7 Drawing Sheets

INTERNET PROTOCOL MULTICAST ON PASSIVE OPTICAL NETWORKS

BACKGROUND INFORMATION

Internet Protocol (IP) multicast enables modern data networks to save bandwidth and processing capacity by reducing the number of copies of data packets transmitted from a source to a destination. In a traditional unicast model, source devices transmit content (e.g., a video file, etc.) directly to a destination device by referencing an IP address associated with the destination device. Therefore, even if multiple destination devices are requesting the same content at the same time, multiple copies of the content are transmitted simultaneously. While this model is effective for on-demand content-related activity, such as web browsing, it is inefficient for some types of media distributions, such as streaming video for IP television, distance learning, etc.

Multicast operates in a manner more similar to a traditional broadcast model. Destination devices wishing to receive content from a particular source join a multicast group designated by a particular address. The content is delivered to all destinations associated with the address. Because they share a common address, known as the multicast group address, only a single copy of the content needs to be transmitted across any single hop in a network, such as between routers, etc.

Unfortunately, implementing IP multicast (IP being a layer 3 protocol) on a layer 2 network, such as the ATM network which forms the basis of many broadband passive optical networks (BPONs), typically requires significant overhead, thereby reducing its effectiveness.

DETAILED DESCRIPTION OF PREFERRED EMBODIMENTS

The following detailed description of exemplary embodiments refers to the accompanying drawings. The same reference numbers in different drawings may identify the same or similar elements. Also, the following detailed description does not limit the invention.

Implementations described herein provide for IP multicast on ATM-based PON systems without requiring the increased cost and latency introduced by segmentation and reassembly (SAR) of ATM cells and IGMP snooping processing. In one embodiment, an IP router upstream from the PON, upon receipt of an IGMP join (or leave) request message, captures address information associated with a requesting client. Logic on the IP router transmits (e.g., via a communication/control channel) the captured address information to the optical line terminal (OLT) to populate (or modify) one or more multicast state tables in the OLT, thereby indicating where multicast traffic is to be delivered.

Subsequently, the OLT may identify addressing information from ATM-traffic (which may include multicast traffic) received from the IP router. This information may be compared to the information in the multicast state tables. When a match is identified, the ATM traffic may be forwarded on ports with the identified addresses.

Figure 1:
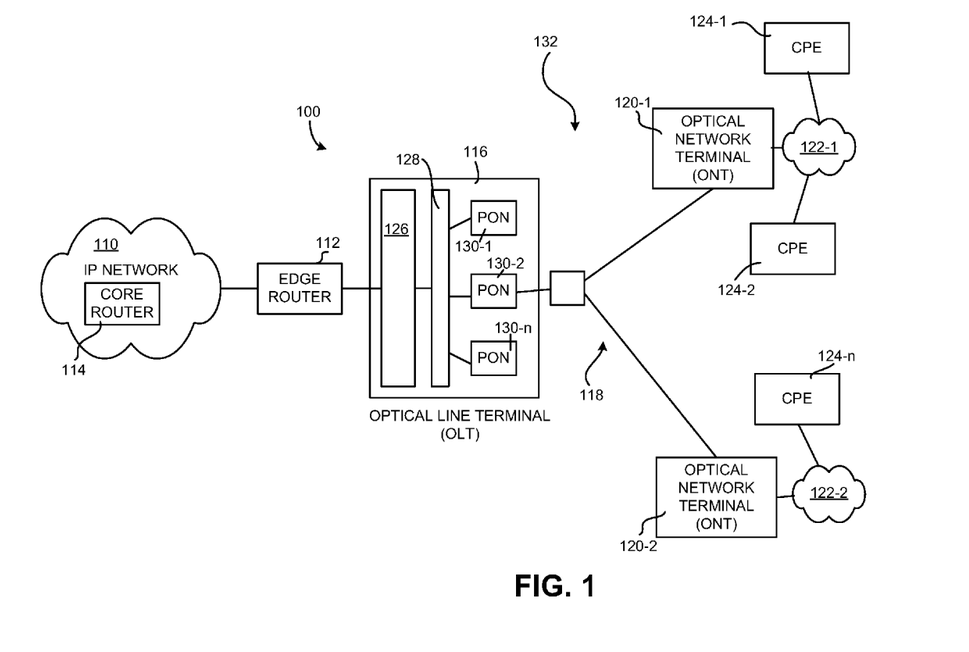
FIG. 1 is a diagram of an exemplary system in which embodiments described herein may be implemented.

FIG. 1 is a diagram of an exemplary system in which embodiments described herein may be implemented. As illustrated, system 100 may include a first network 110, edge router 112, core router 114, optical line terminal (OLT) 116, optical distribution network (ODN) 118, optical network terminals (ONTs) 120-1 and 120-2 (collectively, ONTs 120, and individually ONT 120-x), customer networks 122-1 and 122-2 (collectively, customer networks 122, and individually, customer network 122-x), and customer premises equipment (CPE) devices 124-1 to 124-n (collectively, CPE devices 124, and individually, CPE device 124-x).

First network 110 may include a Local Area Network (LAN), a wide area network (WAN), such as the Internet, a private WAN, or a combination of the Internet and a private WAN, that is used to transport data. First network 110 may include a number of network devices. As is particularly shown in FIG. 1, first network 110 may include a number of routers or other switching devices that transmit data through first network 110. For example, first network 110 may include edge router 112 and core router 114.

Edge router 112 may connect devices, such as OLT 116, to first network 110. Core router 114 may transmit data between other routers within first network 110. In addition to simply routing data, edge router 112 and core router 114 may support other "value added" functions, such as quality of service (QoS) features, specialized security functions, such as IPsec (IP security) encryption, access control, statistics relating to multicast transmissions, or accounting features. As described herein, edge router 112 may include an IP router configured to make forwarding decisions based on layer 3 information included in received data. To accommodate the use of a passive optical network, edge router 112 may be configured to convert data into ATM cells by, for example, segmenting Ethernet frames used to carry IP traffic into a series of ATM cells, each having a 48 byte payload and a 5 byte header. Edge router 12 may then output the ATM cells to OLT 116 for distribution via the optical network.

A network service provider, such as for example, a telecommunications company providing network connectivity to a subscriber at ONTs 120, may provide connectivity between first network 110 through OLT 116 and ODN 118. OLT 116 may include hardware and/or software for providing an interface between ODN 118 and the backbone network(s) associated therewith (e.g., first network 110, a voice gateway, a public switched telephone network (PSTN), a session initiation protocol (SIP) network, etc.). OLT 116 may, for instance, be responsible for allocating bandwidth to subscribers and may provide time division multiplexed (TDM) interfaces such as synchronous optical network (SONET) with ODN 118. As briefly described above, OLT 116 may receive ATM cells from edge router 112 and may provide the cells to a subscriber at one of ONTs 120 via TDM techniques.

As shown in FIG. 1, OLT 116 may include an ATM wide area network (WAN) module 126, backplane 128, and PON cards 130-1 to 130-n (collectively, PON cards 130, and individually PON card 130-x). ATM WAN module 126 may receive ATM cells from edge router 112, with each received ATM cell including identifier information (e.g., virtual channel identifier (VCI) and virtual path identifier (VPI) information). ATM WAN module 126 may, based on the identifier information, forward a particular cell toward one or more of PON cards 130 for delivery to intended recipients. Backplane 128 may connect ATM WAN module 126 to PON cards 130 and may include, for example, a configurable switch fabric.

PON cards 130 may receive ATM cells from ATM WAN module 126 and convert the cells into optical signals for output via ODN 118. Each PON card 130-*x* may provide one or more interface ports for connecting to individual optical fibers in ODN 118. In one implementation, each PON card 130-*x* may include a single fiber optic port capable of supporting 32 ONTs 120 via ODN 118. In other implementations, PON cards 130 may include more than one fiber optic port. In such an implementation, PON cards 130 may include logic for switching received traffic to an appropriate port.

ODN 118 may include one or more strands of optical fiber, passive optical splitters, etc. Collectively, OLT 116, ODN 118, and ONTs 120 form passive optical network (PON) 132. For example, PON 132 may implement a fiber to the premises (FTTP) network in which a number of subscribers are provided with network connectivity by a length of optical fiber that runs from OLT 116 to the premises of the subscribers (e.g., ONTs 120). The FTTP network may be used to provide, for example, one or both of telephone and broadband services (i.e., Internet connection, television, etc.) to the subscribers. PON 132 may include a high-speed fiber optic network, such as Verizon's FiOS™ network. It should be understood that the general term PON may be interpreted to include different types of PONs including Broadband PON (BPON), ATM PON (APON), Gigabit PON (GPON), 10 Gigabit Ethernet PON (10 GE-PON), etc.

The exemplary system configuration illustrated in FIG. 1 is provided for simplicity. A typical system 100 may include more or fewer elements than those illustrated in FIG. 1, or a different configuration of elements than illustrated. System 100 may also include additional elements, such as amplifiers, switches, gateways, routers, monitoring systems, etc., that aid in routing/forwarding traffic toward its intended destination.

Figure 2:
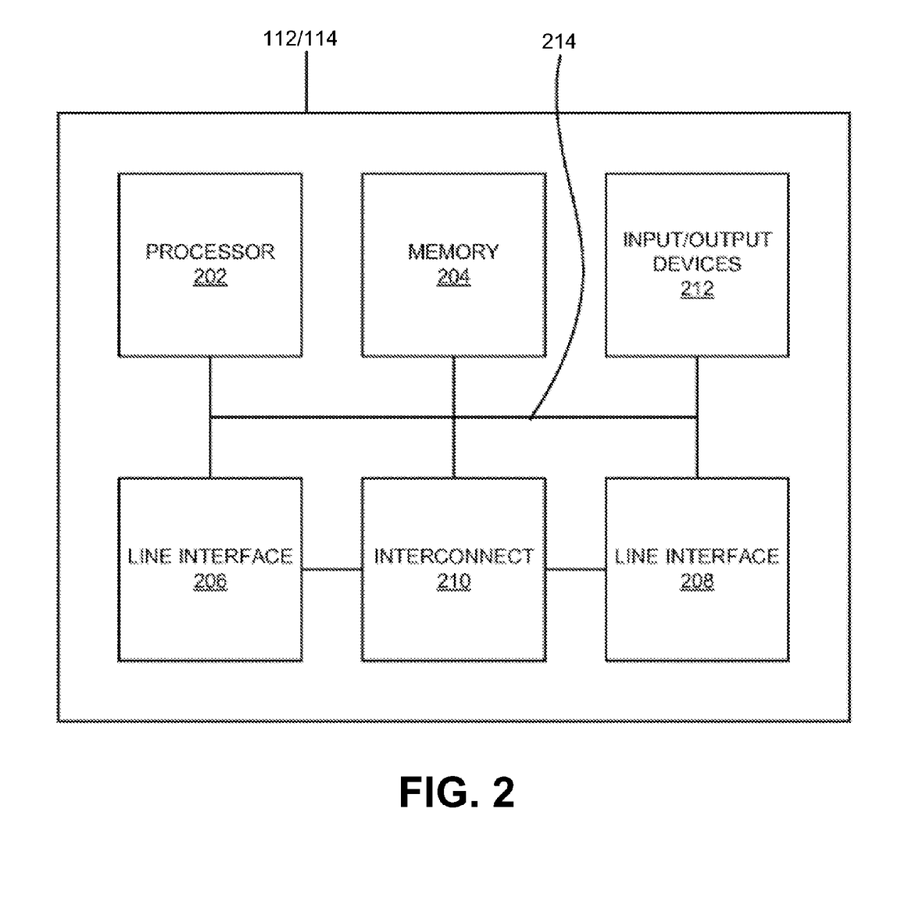
FIG. 2 is a diagram illustrating an exemplary implementation of the core router and/or the edge router of FIG. 1.

FIG. 2 is an exemplary diagram of a core router 114 or edge router 112 (hereinafter called "device 112/114"). Each of devices 112 and 114 may include a processor 202, a memory 204, line interfaces 206 and 208, an interconnect 210, input/output devices 212, and a bus 214. It should be understood that, in operation, router 112/114 may include more or fewer elements than illustrated in FIG. 2, or a different configuration of elements than illustrated.

Processor 202 may include one or more processors, microprocessors, application specific integrated circuits (ASICs), field programmable gate arrays (FPGAs), and/or processing logic optimized for networking and communications. Processor 202 may process packets, frames, cells, and/or network path-related information. Memory 204 may include static memory, such as read only memory (ROM), dynamic memory, such as random access memory (RAM), and/or onboard cache, for storing data and machine-readable instructions. Memory 204 may also include storage devices, such as a floppy disk, a CD ROM, a CD read/write (R/W) disc, and/or flash memory, as well as other types of storage devices. Line interfaces 206 and 208 may include devices for receiving incoming data from networks and for transmitting packets or other data units (e.g., ATM cells, Ethernet frames, etc.). Interconnect 210 may include switches or other logic for conveying an incoming packet from line interface 206 to line interface 208 based on a packet destination and stored path information. Examples of interconnect 210 may include a communication bus or a switch fabric. Input/output devices 212 may include a display console, keyboard, mouse, and/or other types of devices for converting physical events or phenomena to and/or from digital signals that pertain to devices 112/114. Input/output devices 212 may allow a user or a network administrator to interact with devices 110/120 (e.g., configure devices 112/114). Bus 214 may include a path that permits communication among components of each of devices 112/114.

Unlike IP switching devices, which route or switch traffic based on layer 3 packets each having discrete source and destination address information in their headers, the data used in ATM networks is encoded into cells having fixed sizes (53 bytes). ATM cell headers do not include source and destination address information and, instead, include virtual circuit (VC) identifiers (e.g., virtual connection identifiers (VCI) and virtual path identifiers (VPI)) used to make forwarding decisions. Accordingly, OLT 116 cannot make switching decisions (e.g., multicast forwarding decisions) for ATM traffic based on destination addresses included in the IP traffic. As described above, prior attempts to transmit multicast traffic via ATM networks has required processor intensive segmentation and reassembly (SAR) of the cells in order to perform IGMP snooping of ATM traffic to correctly identify and forward multicast traffic.

Consistent with implementations described herein, edge router 112 and/or OLT 116 may be configured to enable efficient transmission of multicast IP data via PON 132 without requiring SAR and IGMP snooping of the multicast traffic.

Figure 3:
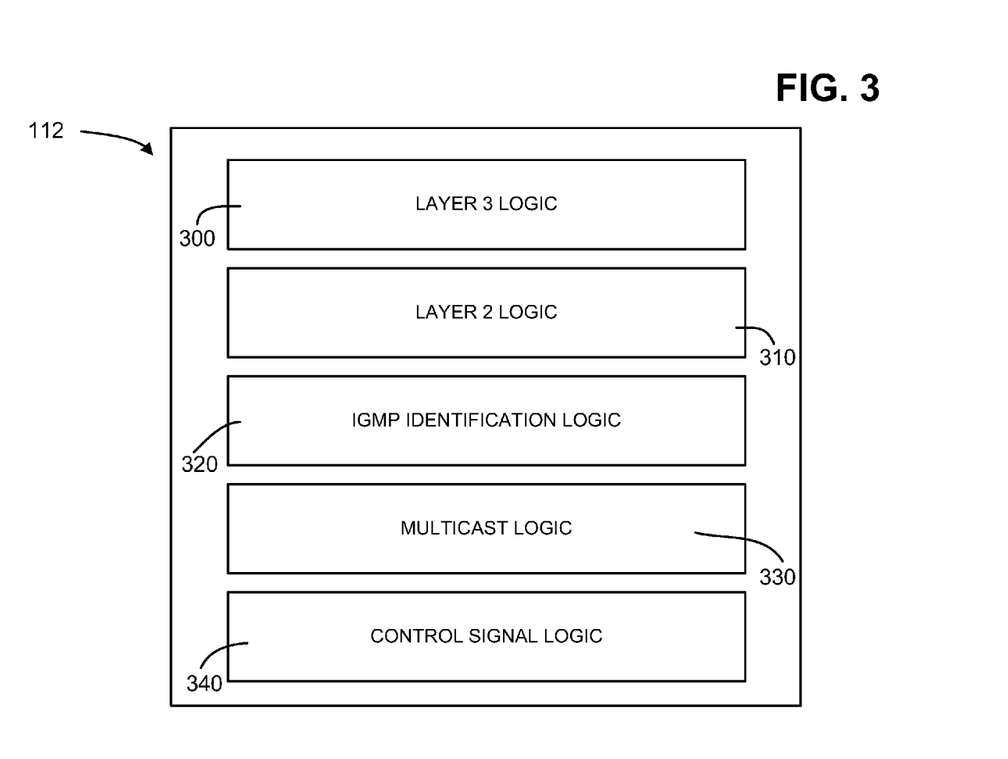
FIG. 3 is a functional block diagram of one implementation of the edge router of FIG. 1.

FIG. 3 is a functional block diagram of one implementation of edge router 112. The logical blocks illustrated in FIG. 3 may be implemented in software, hardware, a combination of hardware and software. In a software implementation, the logical blocks of FIG. 3 may be stored, for example, in memory 204 of edge router 112. It should be understood that, in operation, router 112/114 may include more or fewer functional elements than illustrated in FIG. 3, or a different configuration of elements than illustrated.

As shown, edge router 112 may include layer 3 logic 300, layer 2 logic 310, IGMP identification logic 320, multicast logic 330, and control signal logic 340. Layer 3 logic 300 may include hardware/software configured to receive and process received data based on the data's layer 3 information. For example, layer 3 logic 300 may be configured to receive IP traffic from network 110 and forward the traffic based on layer 3 information (e.g., source/destination IP addresses) associated with the IP traffic.

Layer 2 logic 310 may include hardware/software configured to process traffic to/from layer 2 networks, such as traffic output to or received from OLT 116. In one implementation, layer 2 logic 310 may be configured to convert IP traffic into ATM cells by segmenting variable width Ethernet frames/IP packets into fixed width ATM cells. Consistent with implementations described herein, layer 2 logic 310 may be configured to identify multicast traffic (based, for example, on the destination address associated with the traffic) and may transmit a single copy of multicast traffic to OLT 116 for distribution to active ONTs 120.

IGMP identification logic 320 may be configured to receive IGMP messages from OLT 116 and extract information regarding the multicast group specified and the address/identity of the requesting device. For example, CPE device 124-1 may generate an IGMP join request when a user navigates to a particular IPTV channel. IGMP is part of the IP protocol and, accordingly, IGMP messages are transmitted via layer 3 IP packets. In this example, ONT 120-1 receives the layer 3 IGMP message, converts the message to ATM cells, converts it to an optical signal, and forwards the optical signal upstream to OLT 116 via ODN 118.

PON card 130-2 receives the optical signal that includes the IGMP message and converts it to layer 2 ATM cells. The ATM cells are forwarded to edge router 112 via ATM WAN card 126. Layer 2 logic 310 in edge router 112 performs SAR on the ATM cells to reconstruct the original layer 3 IGMP message. At this point, IGMP identification logic 320 may determine the content of the IGMP message and determine, based on the content, whether a multicast state table associated with edge router 112 needs to be modified.

The multicast state table may be stored, e.g., in memory 204 and may include a number of entries mapping information relating to individual multicast groups (e.g., the IP address associated with the multicast group, the media access control (MAC) address associated with the group, etc.) to the hosts devices that belong to the multicast group (e.g., IP or MAC addresses associated with member host devices). When IGMP identification logic 320 identifies an IGMP message requiring modification of the multicast state table, multicast logic 330 may update the multicast state table.

Consistent with implementations described herein, control signal logic 340 may enable edge router 112 to establish an out-of-band communication channel with OLT 116. Using this communication channel, control signal logic 340 may transmit multicast state table information to OLT 116. Exemplary control channels may include a common open policy service (COPS) channel, a DIAMETER channel, or an Access-Network Control Protocol (ANCP) channel.

Given the nature of OLT 116 as a layer 2 device, the multicast state table maintained by multicast logic 330 may be configured to include MAC address information corresponding to particular multicast groups and VPI/VCI information corresponding to CPE devices 124 registered to receive the multicast content associated with these groups. Control signal logic 340 may transmit the destination MAC address identifying the multicast group and the VPI/VCI information identifying the active customers (e.g., the CPE devices 124 requesting or "tuning into" the content) to OLT 116 via the established control channel. As described in additional detail below, OLT 116 may store this multicast state table information and use the stored information to make layer 2 forwarding decisions for subsequently received multicast traffic.

In a second implementation, OLT 116 may be configured to include IGMP snooping logic (described below). In this implementation, edge router 112 may not include control signal logic 340 or may not transmit multicast state information to OLT 116 via control signal logic 340. Rather, OLT 116 may identify and self-populate its multicast state table(s).

Figure 4:
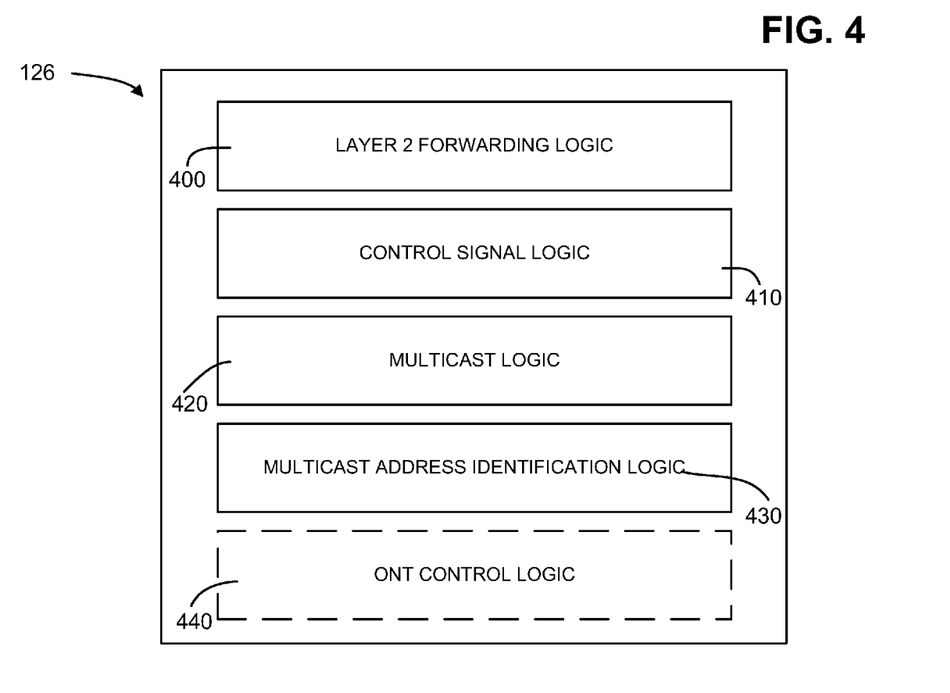
FIG. 4 is a functional block diagram of one implementation of the ATM WAN module of FIG. 1.

FIG. 4 is a functional block diagram of one implementation of ATM WAN module 126 on OLT 116. The logical blocks illustrated in FIG. 4 may be implemented in software, hardware, a combination of hardware and software. As shown, OLT 116 may include layer 2 forwarding logic 400, control signal logic 410, multicast logic 420, multicast address identification logic 430, and optional ONT control logic 440. It should be understood that, in operation, OLT 116 may include more or fewer functional elements than illustrated in FIG. 4, or a different configuration of elements than illustrated.

Layer 2 forwarding logic 400 may include hardware/software configured to receive and process data based on the data's layer 2 information. For example, layer 2 forwarding logic 400 may include hardware/software configured to process ATM traffic from edge router 112 and forward the ATM traffic to particular PON cards 130 based on the layer 2 information. As briefly described above, ATM traffic may be forwarded based on virtual circuit (e.g., permanent virtual circuit (PVC)) information included within the headers of received ATM cells.

Control signal logic 410 may be configured to receive multicast state information from edge router 112, via an out-of-band communication channel, such as a COPS channel, an ANCP channel, or a DIAMETER channel. As described above, the multicast state information may include MAC address information corresponding to particular multicast groups and VPI/VCI information corresponding to CPE devices 124 registered to receive the multicast content associated with these groups.

Multicast logic 420 may include hardware/software configured to store a multicast state table in, for example, a memory associated with OLT 116. In one implementation, the multicast state table may be stored in a ternary content addressable memory (TCAM). CAMs in general and TCAMs in particular are memory structures adapted for rapid access of information.

Multicast logic 420 may be configured to receive the multicast state information received by control signal logic 410 and update the multicast state table based on the information. For example, the received multicast state information may indicate that a particular VCI/VPI combination (e.g., designating a particular ONT 120) has joined a multicast group identified by a particular MAC address. For "channels" tuned into by multiple customers, the multicast state table may indicate more than one VCI/VPI combination associated with destination multicast MAC address corresponding to the particular channel (e.g., the multicast group).

In one implementation, multicast logic 420 may be further configured to identify PON cards 130 associated with the VCI/VPI information in the multicast state table. The identity of each of the particular PON cards 130 may be included in the multicast state table. Additionally, for multi-port PON cards 130, multicast logic 420 may transmit multicast state sub-tables to each PON card associated with at least one customer receiving multicast traffic. For example, if PON card 130-2 is associated with a VCI/VPI (e.g., a particular customer) that has joined a particular multicast group, this information may be transmitted to PON card 130-2. PON card 130-2 may include logic for updating its multicast state table with port information corresponding to particular VCI/VPI information. In this manner, each PON card 130 may be provided with a multicast state table indicating the multicast groups active on the PON card and the PON ports associated with the multicast groups, at any particular time. As edge router 112 transmits updated multicast state information to OLT 116, the content of all multicast state tables may be updated accordingly.

As described briefly above, in a second implementation, multicast logic 420 may include IGMP snooping logic configured to identify and extract multicast group and VCI/VPI from IGMP messages traveling from CPE devices 124 to edge router 112. In this implementation, multicast logic 420 self-populates the multicast state table(s) based on the extracted or identified information. This implementation is useful in cases where OLT 116 is connected with edge router 112 via a non-ATM interface such as a Gigabit Ethernet interface. In this implementation, the ATM SAR function may already be performed by ATM WAN module 126 in order to forward Ethernet packets/frames to edge router 112. Given that the SAR processing has already been performed, IGMP snooping may be implemented to on OLT WAN module 126 to populate the multicast state table.

Multicast address identification logic 430 may include hardware/software configured to determine information identifying a multicast group associated with received layer 2 traffic. For example, multicast address identification logic 430 may determine or extract destination MAC address information associated with the received multicast traffic from edge router 112.

In one implementation, multicast address identification logic 430 may extract the destination MAC address information by identifying a last cell in a prior ATM adaptation layer 5 (AAL5) frame. This identification may be based on the content of a third bit (e.g., an end of frame (EOF) bit) in a payload type indicator (PTI) field in the header of each received ATM cell.

Given that the prior cell was determined to be the last cell of the prior frame, the next cell received is logically the first cell of the next frame. Accordingly, an offset indicating a location of the destination MAC address within an encapsulated frame may be known. For example, for IP traffic encapsulated over ATM using logical link control (LLC)/subnetwork access protocol (SNAP), it may be known that the destination MAC address associated with the frame may be located in the first cell of the frame following a 5 bytes ATM header, a three byte LLC header, a five byte SNAP header, and a 6 byte source MAC address. That is, the six byte destination MAC address may be extracted from bytes 20-25 of the first cell of a frame. This process may be referred to as bit mapping. In other encapsulation/protocol implementations, other offsets may be known. Unlike SAR or IGMP snooping, identifying the destination MAC address information for an Ethernet frame encapsulated over ATM does not require reconstruction the entire Ethernet frame or IP packet.

Multicast address identification logic 430 may match the identified destination MAC address against the contents of the multicast state table. If it is determined that the identified destination MAC address corresponds to an entry in the multicast state table, layer 2 forwarding logic 400 may forward cells in the current frame to PON cards 130 associated with the multicast MAC address. That is, those PON cards 130 that have active customers requesting the associated multicast traffic. Because the multicast state table identifies all customers that are to receive the corresponding multicast content, only a single copy of the cells is forwarded to each active PON card 130, regardless of whether more than one customer is destined to receive the traffic for each PON card 130.

Similarly, for PON cards 130 having multiple ports, the multicast state tables maintained on the PON cards may be queried to determine the port or ports associated with the multicast traffic, with a single copy of the multicast data cells being transmitted on active ports, regardless of the number of customers receiving the data via the ports.

ONT control logic 440 may include hardware/software configured to transmit active customer information to each ONT 120. For example, ONT control logic 440 may, via an out-of-band control channel, such as an ONT management and control interface (OMCI), transmit active multicast group information to each ONT 120 having at least one active customer. For each ONT 120, the multicast state information may designate the active channels (e.g., designated by destination MAC address associated with the active channels).

Figure 5:
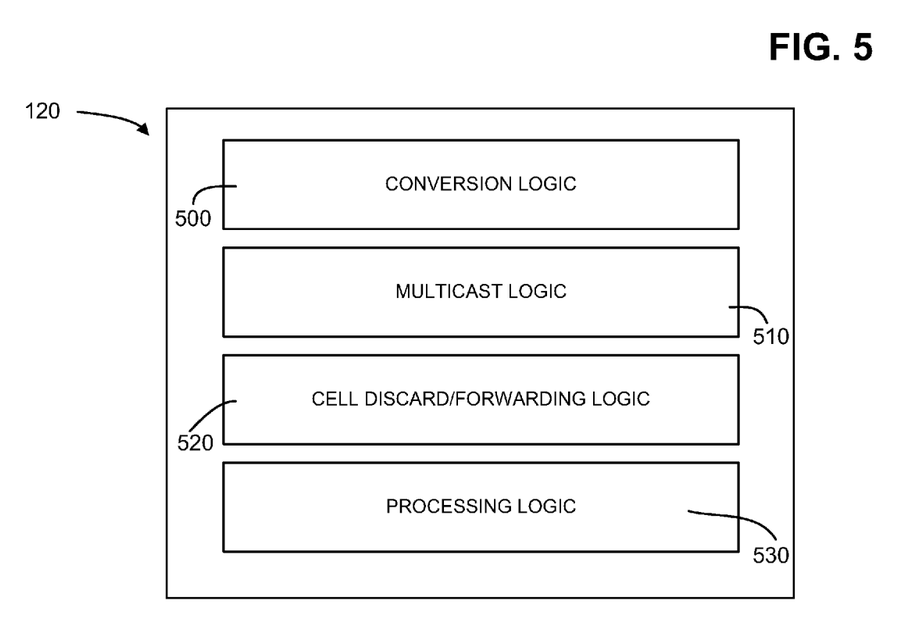
FIG. 5 is a functional block diagram of one implementation of an ONT of FIG. 1.

FIG. 5 is a functional block diagram of one implementation of an ONT 120. The logical blocks illustrated in FIG. 5 may be implemented in software, hardware, a combination of hardware and software. As shown, ONT 120 may include conversion logic 500, multicast logic 510, cell discard/forwarding logic 520, and processing logic 530. It should be understood that, in operation, ONT 120 may include more or fewer functional elements than illustrated in FIG. 5, or a different configuration of elements than illustrated.

Conversion logic 500 may include hardware/software configured to convert the optical signals received from OLT 116 via ODN 114. For example, conversion logic 500 may convert received SONET signals to ATM cells.

Multicast logic 510 may receive the active multicast group information transmitted by OLT 116. As described above, the received active multicast group information may include information relating to multicast groups (e.g., the "channels") active on the particular ONT 120. The active multicast group may be received, in one implementation, via an out-of-band control channel, such as an OMCI channel. The received information may be stored in a memory structure on ONT 120, such as a CAM or TCAM.

In another implementation, multicast logic 510 on ONT 120 may be configured to perform IGMP snooping on upstream traffic. In this implementation, ONT 120 may be configured to extract the destination MAC address information from the upstream IGMP messages. In such an embodiment, ONT 120 may not receive active multicast group information from OLT 116.

Because multiple ONTs 120 (e.g., thirty-two) may be passively coupled to a single PON card 130, multicast traffic having even a single active customer associated with a given PON card 130 will necessarily be forwarded passively to all coupled ONTs 120. In one implementation, ONTs 120 may identify multicast traffic based on a range of known multicast MAC destination addresses. More specifically, it may be known that multicast/broadcast traffic uses a "1" in the 8th bit position of the destination MAC address. Furthermore, it may be known that multicast destination MAC addresses begin with 01:00:5E (hex). To preserve processing bandwidth on ONT 120, received ATM traffic may be compared to the stored active multicast group information to determine whether it matches the active channels on ONT 120.

Similar to the processing described above in relation to multicast address identification logic 430 on ATM WAN module 126, multicast logic 510 on ONT 120 may be configured to determine information identifying a multicast group associated with received layer 2 (e.g., ATM) traffic. For example, multicast logic 510 may determine or extract destination MAC address information associated with the received multicast traffic based on known offset information.

As with multicast address identification logic 430, multicast logic 510 may extract the destination MAC address information by identifying a first cell in an Ethernet frame encapsulated over ATM. The offset indicating the location of the destination MAC address within the encapsulated frame may be known and the destination MAC address may be extracted from the cell. Unlike SAR or IGMP snooping, identifying the destination MAC address information for an Ethernet frame encapsulated over ATM does not require reconstruction of the entire Ethernet frame or IP packet and does not require significant processing overhead.

If the extracted destination MAC address does not match an address in the stored active multicast group information, multicast logic 510 determines that the cell is not destined for a connected CPE device 124 and cell discard/forwarding logic 520 drops the cell. If the extracted destination MAC address does match an address in the stored active multicast group information however, multicast logic 510 determines that the cell is destined for a connected CPE device 124 and cell discard/forwarding logic 520 forwards the cell to processing logic 530. Processing logic 530 may be configured to perform SAR to reconstruct the original IP traffic/Ethernet frames. This traffic may be forwarded to the requesting CPE device 124.

Figure 6:
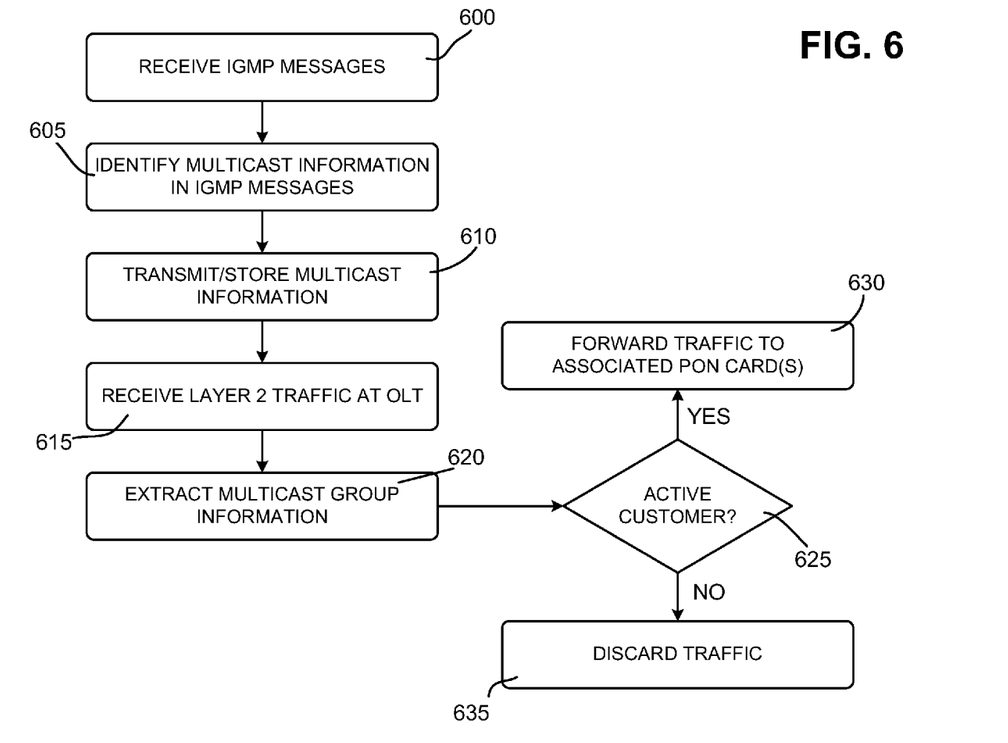
FIG. 6 is a flow chart of an exemplary process implementing IP multicast via an ATM PON system, consistent with exemplary embodiments.

FIG. 6 is a flow chart of an exemplary process for implementing IP multicast via an ATM PON system, consistent with exemplary embodiments. In one embodiment, the processing of FIG. 6 may be performed by one or more components of system 100, such as edge router 112, OLT 116, and ONTs 120. In other embodiments, some or all of the processing described below may be performed by other components or groups of components including or excluding components within system 100.

Processing may begin with an edge router 112 receiving one or more IGMP messages from a CPE device 124 via ONT 120, ODN 118, and OLT 116 (block 600). Exemplary IGMP messages may include multicast join, leave, or membership report messages identifying particular multicast groups (or "channels") to which the particular CPE device 124 wishes to either join (e.g., "tune into") or leave (e.g., "tune away from").

As described above, ONT 120 may be configured to convert layer 3 (e.g., IP) packets from CPE devices 124 into layer 2 (e.g., ATM cells) data. This data is then converted into optical signals for delivery to OLT 116 via ODN 114. At OLT 116, the optical signals are converted to electrical signals (e.g., ATM cells) and forwarded to edge router 112 for segmentation and reassembly (SAR) as IP packets.

Edge router 112 may identify the content of the IGMP messages (block 605). For example, edge router 112 may be a multicast-enabled router. IGMP identification logic 320 on edge router 112 may be configured to identify the multicast group identified in the IGMP messages as well as information regarding the CPE device 124 or ONT 120 (e.g., the customer) that sent the message. Collectively, this information may be referred to as multicast state information. In one implementation, the multicast group information may include a MAC destination address associated with the multicast group and the CPE device/ONT information may include VCI/VPI information used to deliver ATM traffic to the particular CPE device 124 or ONT 120.

The multicast state information may be transmitted to/stored on OLT 116 (block 610). For example, multicast logic 330 on edge router 112 may transmit the identified multicast state information to OLT 116 via an out-of-band control channel, such as a COPS channel, a DIAMETER channel, or an ANCP channel. OLT 116 (e.g., multicast logic 420) may store the received multicast state information into a multicast state table. In some implementations, the received multicast state information may cause modifications to be made to a current multicast state table, such as the removal of CPE device/ONT information to indicate that a particular CPE device 124 has "tuned away" from the multicast group (e.g., changed the "channel") or the addition of CPE device/ONT information to indicate that a particular CPE device 124 has "tuned into" the multicast group.

OLT 116 may, depending on the capabilities and features of its PON cards 130, populate multicast sub-tables on each PON card 130, to indicate the multicast groups active on the particular PON card 130. Furthermore, in some implementations, information regarding the PON cards 130 having active customers for a particular multicast group is also included in the multicast state table.

In a second implementation, IGMP message receipt and identification may be performed by OLT 116 via IGMP snooping processing performed on upstream traffic from CPE devices 124. In this implementation, OLT 116 self-populates the multicast state table.

OLT 116 may receive layer 2 traffic from edge router 112 (block 615). For example, Ethernet frames encapsulated into ATM cells may be received by ATM WAN module 126 on OLT 116. OLT 116 may identify multicast group information associated with the layer 2 traffic (block 620). For example, as described above, destination MAC address information may be identified/extracted from the received cells by examining specific bytes in the first cell of each AAL5 frame.

OLT 116 may determine whether at least one active customer (e.g., ONT 120/CPE device 124) for the identified multicast group (block 625). For example, OLT 116 may compare the identified multicast information to the multicast state table. In one implementation, ATM WAN module 126 in OLT 116 may compare the destination MAC address identified/extracted from the received ATM traffic to the multicast group information in the multicast state table, to identify active customers that should receive the content associated with the current frame (e.g., based on VCI/VPI and/or PON card information).

If it is determined that at least one active customer exists for the identified multicast information (e.g., an entry corresponding to the identified destination MAC address is found in the multicast state table) (block 625-YES), ATM WAN 126 may forward the ATM cells for the current AAL5 frame to the PON cards 130 associated with the active customers for output via ODN 118 (block 630). If no active customer exists for the identified multicast information (e.g., an entry corresponding to the identified destination MAC address is not found in the multicast state table) (block 625-NO), ATM WAN 126 may discard the cells in the current frame (block 635).

For PON cards 130 having a single port, each PON card 130 receiving the ATM traffic will simply convert the received cell into a optical signal and forward the signal to ONTs 120 via ODN 118. However, for PON cards 130 having multiple ports, PON cards 130 may be configured to compare the received ATM cells with the multicast state sub-table stored on the PON card to identify the particular port associated with the active customers. The received ATM traffic is then forwarded to the matching ports for optical conversion and output via ODN 114.

Figure 7:
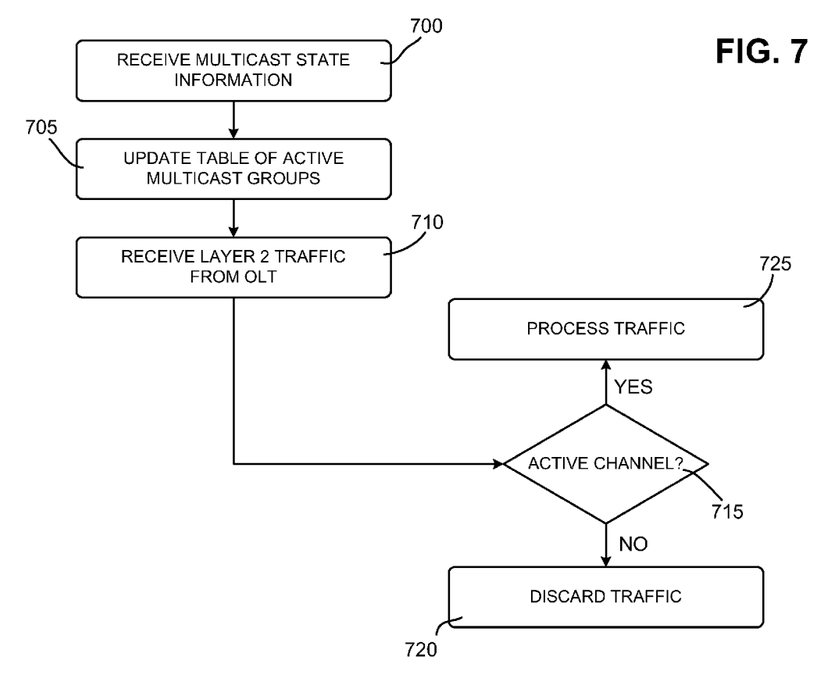
FIG. 7 is a flow chart of another exemplary process for implementing IP multicast via an ATM PON system.

FIG. 7 is a flow chart of another exemplary process consistent with embodiments described herein. In one embodiment, the processing of FIG. 7 may be performed by one or more components system 100, such as OLT 116 and ONTs 120. In other embodiments, some or all of the processing described below may be performed by other components or groups of components including or excluding components within system 100.

Processing may begin with ONTs 120 receiving multicast state information relating to customers connected thereto (block 700). For example, as described above, ONTs 120 may receive multicast state information from OLT 116 via an out-of-band control channel, such as an OMCI channel. A table of active multicast groups or channels associated with customer connected to the particular ONT 120 may be updated based on the received multicast information (block 705).

In another exemplary implementation, ONT 120 may be configured to extract information regarding active multicast groups from the upstream IGMP messages received from CPE devices 124. For example, ONT 120 may perform IGMP snooping on upstream layer 2 traffic to identify changes to the active channel table on ONT 120.

ONTs 120 may receive layer 2 traffic from OLT 116 via ODN 114 (block 710). For example, ONTs 120 may receive and convert optical signals to ATM cells. ONTs 120 may determine whether the received ATM cells are associated with an active multicast channel on ONT 120 (block 715). For example, ONTs 120 may extract destination MAC address information from the received ATM cells in the manner described above. The extracted destination MAC address information may be compared to information in the active channel table.

If the destination MAC address information does not match a currently active channel (block 715—NO), ATM cells associated with the current frame are dropped (block 720). However, if the destination MAC address information does match a currently active channel (block 715—YES), ATM cells associated with the current frame are processed (e.g., SARed) to reassemble the multicast layer 3 data and forwarded to requesting CPE devices 124 (block 725). By enabling received traffic that is not associated with an active channel to be dropped prior to processing, bandwidth on the processing logic may be preserved.

Implementations described herein enable efficient implementation of IP multicast on ATM PON systems. More specifically, a PON system may be configured to enable layer 2 devices, such as OLTs and ONTs to extract and identify IP multicast information encapsulated within layer 2 data units, such as ATM cells. By leveraging upstream IP devices or processing on upstream IGMP messages, layer 2 information regarding the multicast groups and customers may be stored and used to perform rapid identification of downstream multicast traffic at the layer 2 level, without requiring processor and time-intensive segmentation and reassembly.

The foregoing description of exemplary implementations provides illustration and description, but is not intended to be exhaustive or to limit the embodiments described herein to the precise form disclosed. The specification and drawings are accordingly to be regarded in an illustrative rather than restrictive sense. Modifications and variations are possible in light of the above teachings or may be acquired from practice of the embodiments.

For example, while a series of acts has been described above with respect to FIGS. 6 and 7, the order of the acts may differ in other implementations. Moreover, non-dependent acts may be performed in parallel.

It will be apparent that aspects of the invention, as described above, may be implemented in many different forms of software, firmware, and hardware in the implementations illustrated in the figures. The actual software code or specialized control hardware used to implement the invention is not limiting of the invention. Thus, the operation and behavior of the features of the invention were described without reference to the specific software code—it being understood that one would be able to design software and control hardware to implement the aspects based on the description herein.

Further, certain features described above may be implemented as "logic" that performs one or more functions. This logic may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method for implementing multicast via a passive optical network (PON), comprising:
    receiving, at a layer 3 device upstream of an Optical Line Terminal (OLT) device, Internet group multicast protocol (IGMP) messages from a customer device via the OLT device;
    identifying, by the layer 3 device, multicast information associated with the IGMP messages,
    wherein the multicast information includes at least multicast group information and customer identification information;
    transmitting the identified multicast information by the layer 3 device to the OLT device;
    storing, by the OLT device, the multicast information in a multicast state table;
    receiving, at the OLT device, downstream layer 2 traffic;
    extracting, by the OLT device, multicast addressing information from the layer 2 traffic;
    determining, by the OLT device, whether the multicast addressing information matches the multicast group information stored in the multicast state table; and
    forwarding, by the OLT device, the layer 2 traffic on at least one PON interface corresponding to the customer identification information that is associated with the stored multicast group information when the multicast addressing information matches the multicast group information stored in the multicast state table.

2. The method of claim 1, further comprising:
    transmitting the multicast information from the upstream device to the OLT device via an out-of-band control channel.

3. The method of claim 1, wherein the layer 3 device comprises an Internet Protocol (IP) router.

4. The method of claim 1, wherein identifying, by the layer 3 device, multicast information associated with the IGMP messages further comprises:
    performing IGMP snooping on the IGMP messages from the customer device;
    extracting the multicast information associated with the IGMP messages during the IGMP snooping; and
    transmitting the extracted multicast information to the OLT device for storing in the multicast state table.

5. The method of claim 1, wherein extracting, by the OLT device, multicast addressing information from the layer 2 traffic comprises:
    determining a first cell in a frame encapsulated in the layer 2 traffic;
    extracting the multicast addressing information based on an offset associated with the first cell in the frame.

6. The method of claim 5, wherein the offset comprises 20 bytes and wherein the multicast address information comprises a destination media access control (MAC) address associated with the multicast group.

7. The method of claim 1, further comprising:
    storing the multicast group information on an optical network terminal (ONT) device associated with the customer device;
    receiving the forwarded layer 2 traffic at the ONT device;
    extracting multicast addressing information from the layer 2 traffic at the ONT device;
    determining whether the multicast addressing information matches the multicast group information stored on the ONT device; and
    discarding the layer 2 traffic when the multicast addressing information does not match the multicast group information stored on the ONT device.

8. The method of claim 7, further comprising:
    forwarding the layer 2 traffic for processing when the multicast addressing information matches the multicast group information stored on the ONT device.

9. The method of claim 7, wherein storing the multicast group information on the ONT device comprises:
  receiving the multicast group information associated with the ONT device from an optical line terminal (OLT) device forwarding the layer 2 traffic; and
  storing the received multicast group information.

10. The method of claim 7, wherein storing the multicast group information on the ONT device comprises:
  performing IGMP snooping on the upstream IGMP messages at the ONT device;
  extracting the multicast group information associated with the IGMP messages during the IGMP snooping; and
  storing the extracted multicast group information.

11. The method of claim 1, wherein the layer 2 traffic comprises asynchronous transfer mode (ATM) cells.

12. A system for implementing Internet Protocol (IP) multicast via a passive optical network (PON) comprising:
  an upstream edge router;
  an optical line terminal (OLT) device operatively coupled to the upstream edge router;
  a customer premises equipment (CPE) device;
  an optical network terminal (ONT) device operatively coupled to the CPE device; and
  a optical distribution network (ODN) optically coupling the OLT device to the ONT device,
  wherein the upstream edge router is configured to:
    receive Internet group multicast protocol (IGMP) messages from the CPE device via the ONT device, the ODN, and the OLT device;
    identify multicast information associated with the IGMP messages,
    wherein the multicast information includes at least multicast group information and customer identification information;
    transmit the multicast information to the OLT device; and
    transmit layer 2 traffic to the OLT device;
  wherein the OLT device is configured to:
    receive the multicast information from the edge router;
    store the multicast information in a multicast state table;
    receive the layer 2 traffic from the edge router;
    extract multicast addressing information from the layer 2 traffic;
    determine whether the multicast addressing information matches the multicast group information stored in the multicast state table; and
    forward the layer 2 traffic to the CPE device on at least one PON interface in the OLT device corresponding to the customer identification information that is associated with the stored multicast group information when the multicast addressing information matches the multicast group information stored in the multicast state table.

13. The system of claim 12, wherein the edge router is further configured to transmit the multicast information from the edge router to the OLT device via an out-of-band control channel.

14. The system of claim 12, wherein the edge router is further configured to:
  perform IGMP snooping on the IGMP messages from the CPE device;
  extract the multicast information associated with the IGMP messages during the IGMP snooping; and
  transmit the identified multicast information to the OLT device.

15. The system of claim 12, wherein the OLT device is further configured to:
  determine a first cell in a frame encapsulated in the layer 2 traffic; and
  extract the multicast addressing information based on an offset associated with the first cell in the frame.

16. The system of claim 12, wherein the ONT device is configured to:
  store multicast group information associated with the CPE device;
  receive the forwarded layer 2 traffic from the OLT device via the ODN;
  extract multicast addressing information from the layer 2 traffic;
  determine whether the multicast addressing information matches the stored multicast group information; and
  discard the layer 2 traffic when the multicast addressing information does not match the stored multicast group information.

17. The system of claim 16, wherein the ONT device is configured to:
  forward the layer 2 traffic for processing when the multicast addressing information matches the stored multicast group information.

18. A computer-readable memory device having stored thereon sequences of instructions which, when executed by at least one processor, cause the at least one processor to:
  receive, from an upstream Internet Protocol (IP) router, multicast information associated with IGMP messages via an out-of-band control channel;
  store the multicast information received from the upstream IP router in a multicast state table;
  wherein the multicast information includes at least multicast group information and customer identification information corresponding to one or more CPE devices to receive multicast traffic associated with the multicast group;
  receive downstream layer 2 traffic;
  extract multicast addressing information from the layer 2 traffic;
  determine whether the multicast addressing information matches the stored multicast group information; and
  forward the layer 2 traffic to the CPE device on at least one PON interface corresponding to the customer identification information that is associated with the stored multicast group information when the multicast addressing information matches the multicast group information stored in the multicast state table.

19. The computer-readable medium of claim 18, wherein the sequences of instructions further cause the at least one processor to extract multicast addressing information from the layer 2 traffic further cause the at least one processor to:
  determine a first cell in a frame encapsulated in the received layer 2 traffic; and
  extract the multicast addressing information based on an offset associated with the first cell in the frame.

* * * * *